April 10, 1951

J. A. TOURTELLOT 2,548,082

DUAL STYLUS PHONOGRAPH PICKUP

Filed Feb. 25, 1949

INVENTOR.
JOHN A. TOURTELLOT
BY
Brown, Denk & Synnestvedt
AGENTS

Patented Apr. 10, 1951

2,548,082

UNITED STATES PATENT OFFICE 2,548,082

DUAL STYLUS PHONOGRAPH PICKUP

John A. Tourtellot, Merchantville, N. J., assignor to Philco Corporation, Philadelphia, Pa., a corporation of Pennsylvania Application March 25, 1949, Serial No. 83,350

5 Claims. (Cl. 179—100.41)

The present invention relates to phonograph apparatus and, particularly, to phonograph tone-arms adapted to support a pickup device for cooperation with a record to be reproduced. More specifically, the invention has to do with an improved tone-arm construction embodying the phonograph controlling arrangement disclosed and claimed in a previously filed application of Richard S. Cranmer, which application is assigned to Philco Corporation and bears Serial No. 74,325 and the filing date of February 3, 1949.

The above-mentioned Cranmer disclosure sets forth a controlling arrangement which is particularly adapted for use with phonograph instruments devised to play records having a relatively narrow groove which is designed to be played at one predetermined rate of speed, as well as records having a wider groove which is designed to be played at another predetermined rate of speed. These two types of records have become known in the trade as "long play" records and "standard play" records, respectively. In order to play both types of records, the instrument is provided with a turntable driving mechanism operable to obtain either of said operational speeds, and with a pickup unit having two differently dimensioned styli or needles, one adapted for cooperation with the narrower groove of "long play" records, and the other adapted for cooperation with the wider groove of "standard play" records. The driving mechanism is provided with a manipulator adjustable to select the turntable speed, and the pickup unit is adjustable to bring either stylus or needle into operative position with respect to the record on the turntable.

The controlling arrangement, as specified in the Cranmer disclosure, comprises a circuit for applying the voltage developed in the pickup unit to the audio system of the phonograph instrument. This circuit includes switch means, parts of which are provided by the mentioned manipulator and pickup unit, so as to close said circuit when the speed and stylus adjustments are properly related, and so as to open said circuit when the speed and stylus adjustments are improperly related. In this manner, unless both the proper stylus and the proper speed are related for the type of record which the user desires to play, the audio system is rendered inoperative and will emit no sound, thereby indicating to the listening user that a maladjustment exists, either in the selection of the stylus, or in the selection of the speed. Also, because the playing of a record at the improper speed results in a highly noticeable distortion, the listening user is able to detect a condition in which the stylus and the speed are related to play one type of record, but in which a record of the other type is on the turntable. Therefore, the arrangement gives adequate warning of the existence of conditions which are apt to result in damage to the stylus, and possibly to the record groove, so that the user can promptly remedy the existing condition before such damage occurs.

It is the primary object of the present invention to provide a construction which facilitates the mounting, in a phonograph tone-arm, of a pickup unit and switch means associated therewith according to the above-mentioned Cranmer disclosure. To that end, the invention provides a unitary contact supporting structure which can be readily mounted within the head of the tone-arm, and with which a pickup unit can be movably associated to effect automatic switching in response to movement of said unit in selecting the desired stylus or needle.

It is also an object of this invention to reduce, to a minimum, the number of parts necessary to secure adequate operation of the above-mentioned control arrangement. For that purpose, the parts are so constructed and associated as to cooperate not only to provide means which assure proper adjustment of the pickup unit in its various operative positions, but also to provide means which effect appropriate retention of the unit in its adjusted position.

Still another and more specific object of the invention has to do with novel structural features which make possible the mutual cooperation of the parts to effect their retention in assembled relationship, and yet permit ready removal of and access to the parts, whenever repair or replacement is needed.

These and other objects, and the manner in which they are attained, will clearly appear from the following description based on the accompanying drawing, in which.

Figure 1:
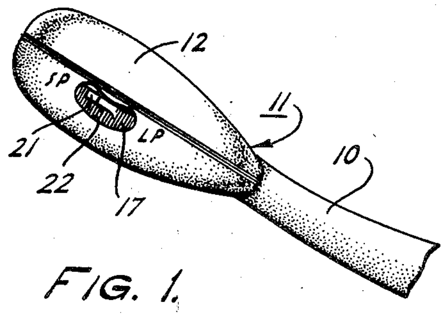
Figure 1 is a top view of the head portion of a phonograph tone-arm embodying the invention.

Referring more particularly to the drawing, the tone-arm 10 includes a hollow head portion 11 which has a top wall 12, end walls 13 and 14, and side walls 15 and 16. These top, end and side walls define a recess which opens at the underside of the tone-arm, and which is adapted to house a pickup unit 17 and its supporting structure. The pickup unit is supported for cooperation with the modulated groove of a record R (Figure 3) so as to be actuated by said groove. As is well known, actuation of the pickup unit generates electrical signals which are transmitted to the audio system of the phonograph instrument, which system converts said signals into sound.

In the arrangement shown in the drawing, the pickup is supplied with two needles 18 and 19 (see Figure 3), one needle having a tip dimensioned to fit the relatively narrow groove of "long play" records, and the other needle having a tip dimensioned to fit the wider groove of "standard play" records. The two needles are attached to a shank 20, and the pickup unit is supported for movement about a generally horizontal pivot to permit the tilting of said unit either to the right or to the left, as clearly viewed in Figure 3, so as to place one needle in the record playing field, and the other needle out of said field. In practice, means is provided to facilitate the tilting of the pickup unit to its two operative positions within the tone-arm head. As shown, the means takes the form of a finger piece 21 which is provided on the pickup unit to protrude through an elongated opening 22 (Figures 1 and 3) in the top wall of the tone-arm head. Suitable indicia, such as LP and SP (see Figure 1), are advantageously imprinted, or otherwise applied, on said top wall at the opposite extremities of opening 22, so as to cooperate with the finger piece to give visual indication as to the position in which the pickup unit is located.

Figure 2:
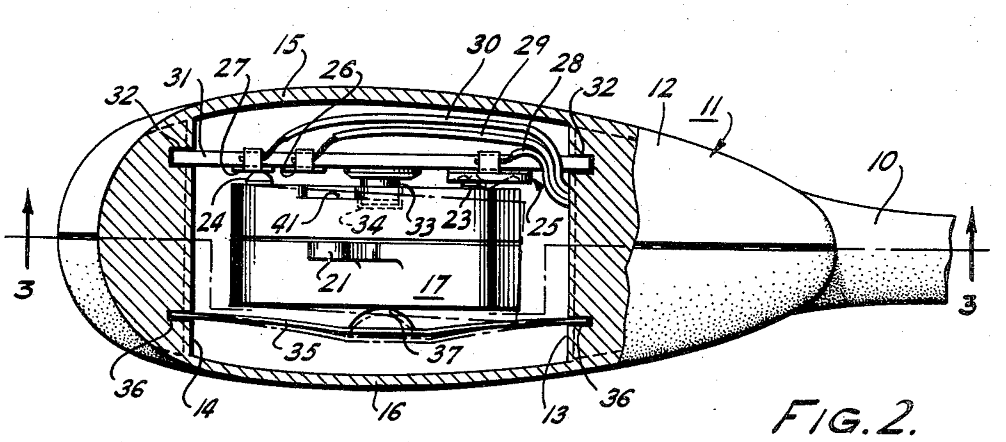
Figure 2 is a view similar to Figure 1, drawn on a larger scale, and with a portion of the top wall of the tone-arm head broken away to illustrate the pickup unit and its supporting structure.
Figure 3:
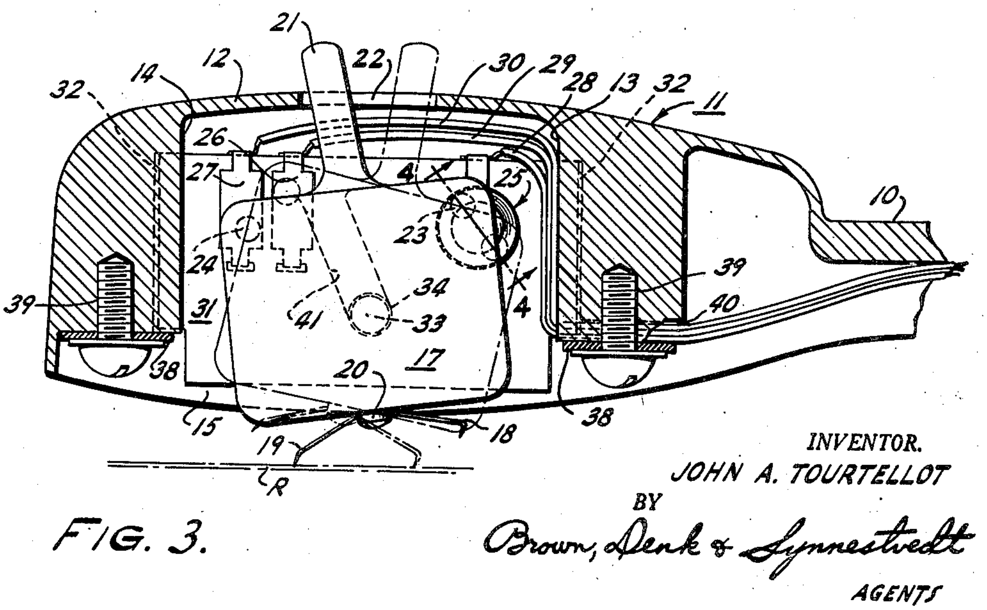
Figure 3 is a sectional view taken substantially along line 3—3 of Figure 2, the alternate position of the pickup unit being shown in dot and dash lines.

The pickup unit is provided with two contact elements 23 and 24 (Figures 2 and 3) which are affixed to the upper corner portions of the unit so as to move, in an arc, with the tilting of said unit to and from one or the other of its two operative positions, as is illustrated in Figure 3. The contact element 23 is disposed for constant engagement with a fixed contact member 25, regardless of the position of the pickup unit, whereas contact element 24 is disposed for selective engagement with either a fixed contact member 26 or a fixed contact member 27, depending upon the position of said unit. This arrangement, although capable of being advantageously utilized for various purposes, is particularly useful when employed for the purpose hereinbefore mentioned and set forth, in detail, in the above-identified Cranmer disclosure. For that particular purpose, conductors 28, 29 and 30 are electrically connected with contact members 25, 26 and 27, respectively, and with the audio system and the switch means controlled by adjustment of the turntable speed.

In accordance with the present invention, contact members 25, 26 and 27 are fixedly mounted on a rigid panel 31 of suitable insulating material. As clearly seen in Figure 3, this panel is of generally rectangular shape, and the mentioned contact members are located adjacent the upper marginal edge of said panel. The end portions of the panel are received in slots 32 which are provided in portions of end walls 13 and 14 of the tone-arm head, and which are located adjacent one side wall 15 of said head. As best seen in Figure 2, a generally cylindrical pin 33 which is also fixedly mounted on panel 31, extends for a short distance from the face of said panel and fits in a generally cylindrical cavity 34 provided in that face of the pickup unit from which contact elements 23 and 24 project.

As clearly appears in Figure 2, engagement of the pin with the cavity, as well as engagement between mated contact elements and members, is obtained by means of a plate 35 of resilient material, such as spring steel. The end portions of this plate are received in slots 36 which are provided in portions of end walls 13 and 14 of the tone-arm head, and which are located adjacent side wall 16 of said head. The intermediate portion of the spring plate is advantageously provided with a dimple 37 disposed to engage the pickup unit and to urge it toward the panel 31. In this manner, proper engagement is effected between the mated contact elements and members and between the interengaged pin and cavity.

The panel 31 and the plate 35 are held within their associated slots by means of rigid strips 38 which are detachably secured, as by screw-threaded element 39, to the underside of end walls 13 and 14 of the tone-arm head. One of these rigid strips is advantageously utilized as means for securing a portion of each of the conductors 28, 29 and 30 to the rear end wall 14 of the tone-arm head. For that purpose, as more clearly shown in Figure 3, the underside of said end wall is provided with a transverse groove 40 into which a portion of each conductor lies, and the rigid strip which overlies said groove, holds the conductor portions in place on said end wall.

Because the only electrical connection between the pickup unit and the conductors is obtained by means of sweeping contact elements and members, it will be understood that the pickup unit may be readily removed from and inserted into the tone-arm head. Removal of the pickup unit is simply accomplished by first displacing the unit in the direction of spring plate 35 so as to deflect said plate sufficiently to permit withdrawal of pin 33 from cavity 34, and then sliding the unit, from between said plate and the panel 31, out through the open underside of the tone-arm head. To insert the pickup unit into the tone-arm head, it is only necessary to introduce the unit through the open underside of said head, and to slide said unit between the panel 31 and spring plate 35 until the pin 33 falls into cavity 34. In order that the pickup unit may be guided in its removal from and insertion in the tone-arm head, the unit is provided with a slot 41 which is of less depth than cavity 34, and which leads from the upper marginal edge of the unit to said cavity. This slot 41, thus, forms a guideway into which pin 33 slides as the pickup unit is removed from or inserted into the tone-arm head.

As previously mentioned, the contact element 23 on the pickup unit is adapted for constant engagement with its associated contact member 25. For that purpose, contact member 25 is so arranged that contact element 23 sweeps over and across said member as said element moves with displacement of the pickup unit. Moreover, it is important to note that, in accordance with the present invention, contact element 23 and contact member 25 are adapted, in cooperation with spring plate 35, to serve as a guide for the pickup unit in its movement to and from one or the other of its operative positions, as a stop to determine such positions, and as a detent to urge and to retain such unit in either position. The manner in which these combined functions are accomplished will be clearly understood from Figures 2, 3 and 4 of the drawing.

Figure 4:
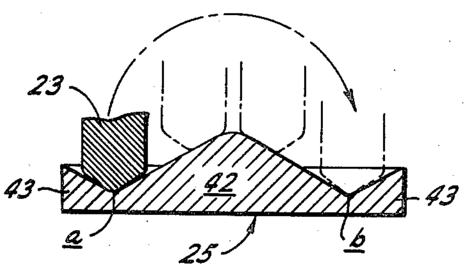
Figure 4 is an enlarged fragmentary sectional view looking in the general direction of arrows 4—4 of Figure 3, and illustrating the cooperative function of certain parts of the switch means associated with the pickup unit.

As more clearly shown in Figure 4, contact member 25 is provided with a centrally disposed substantially conical portion 42 and with an angular portion 43 which surrounds the base of said conical portion so that the converging surfaces of said conical and angular portions provide a seat for the contact element 23. Therefore, when the pickup unit is adjusted in positions shown in full lines in Figure 3, contact element 23, due to the spring action of plate 35 (Figure 2), rests firmly in said seat at a point located to one side of the apex of the conical portion 42, as is represented at *a* in Figure 4. Thus, the contact element 23 becomes securely held between the converging angular surfaces of portions 42 and 43, and the pickup unit which carries contact element 23, is thereby locked in position. When the pickup unit is moved to the alternate position shown in dot and dash lines in Figure 3, the contact element 23 rides over conical portion 42, as is represented in Figure 4. In riding over said conical portion, the pickup unit is slightly displaced angularly, as is illustrated in Figure 2. This displacement of the pickup unit is insufficient to cause the withdrawal of pin 33 from cavity 34, but the displacement is sufficient to deflect spring plate 35 so that as soon as the contact element passes over the apex of the conical portion of member 25, the spring plate acts to urge said contact element into the seat at a point on the other side of said apex, as is represented at *b* in Figure 4. Thus, it will be understood that element 23, member 25 and spring plate 35 act, as a detent, to guide the final movement of the pickup unit to adjusted position, as well as to effect adequate seating of element 23, and that this seating of said element determines the position in which the pickup unit is to operate.

From the foregoing, it will be appreciated that the invention provides a simple and convenient structure which facilitates the incorporation and utilization of the hereinbefore mentioned Cranmer control arrangement in a phonograph tone-arm. It will also be appreciated that the structure which this invention provides, is particularly advantageous in that it allows not only for easy removal and replacement of the pickup unit, but also for ready dismounting and remounting of such parts as the panel and plate which form the supporting structure for the pickup unit. Due to these features of the invention, servicing of the structure, like its assembly, becomes an easy matter, since access to the parts may be had by the simple expedient of removing readily detachable fastening elements.

I claim:

1. A phonograph tone-arm structure comprising a hollow head portion, a pickup unit enclosed within said head portion and having differently dimensioned styli projecting outwardly of said head portion, means mounted in said head portion and movably mounting the pickup unit for selective adjustment in either of two positions to bring a selected stylus into operative position with respect to a record, said means including a rigid panel and a spring plate cooperating to provide a clamp for movably retaining said unit within the mentioned hollow head portion, and switch means including a pair of electrical contact elements on the pickup unit and a set of three electrical contact members on said panel, one contact member on the panel constantly engaging one contact element on the pickup unit regardless of its adjusted position, and the remaining two contact members on the panel being selectively engaged by the other contact element on said unit depending upon its position.

2. A phonograph tone-arm structure as set forth in claim 1, in which the panel and the plate are provided with means cooperating to provide for pivotal movement of the pickup unit in its retaining clamp.

3. A phonograph tone-arm structure comprising a pickup unit having two styli, means movably mounting the pickup unit for selective adjustment in either of two positions to bring a selected stylus into operative position with respect to a record, a pair of electric contact elements on said unit, a contact member in constant engagement with one contact element on said unit regardless of its adjusted position, two other contact members selectively engaged by the other contact element on said unit depending upon its position, the contact member in constant engagement with the mentioned contact element being provided with a substantially conical portion and an angular portion surrounding said conical portion, the angular converging surfaces of said portions defining a seat for the contact element in engagement with said member.

4. A phonograph tone-arm structure comprising a hollow head portion, a rigid panel and a spring plate mounted in spaced relationship within said portion, a multi-stylus pickup unit movably clamped between and by said panel and plate, said panel and plate having pivot forming means engaging opposite face portions of the pickup unit and suspending the latter for pivotal movement between said panel and plate to provide for bringing of a selected stylus into operative engagement with the record, and electrical connections for the pickup unit including contact members on said panel and contact elements on said member.

5. A phonograph tone-arm structure as set forth in claim 4, in which the rigid panel and the spring plate are each provided with a lateral protuberance in engagement with opposite face portions of the pickup unit, said protuberances forming suspension points on which said unit pivots during adjustment movements.

JOHN A. TOURTELLOT.

REFERENCES CITED

The following references are of record in the file of this patent:

UNITED STATES PATENTS

| Number | Name | Date |
|---|---|---|
| 1,570,297 | Dyer | Jan. 19, 1926 |
| 1,822,932 | Loughridge | Sept. 15, 1931 |
| 2,067,347 | Rysick | Jan. 12, 1937 |
| 2,087,135 | Wielage | July 13, 1937 |
| 2,113,401 | Goldsmith | Apr. 5, 1938 |